June 28, 1955

R. H. STIMPSON 2,711,850

DICED MEAT FILLING MACHINE

Filed Feb. 19, 1953

INVENTOR.
ROBERT H. STIMPSON
BY
Christy, Parmelee and Strickland
his
ATTORNEYS.

June 28, 1955 R. H. STIMPSON 2,711,850
DICED MEAT FILLING MACHINE
Filed Feb. 19, 1953 5 Sheets-Sheet 4

INVENTOR.
ROBERT H. STIMPSON.
BY
Christy, Parmelee and Strickland
ATTORNEYS.

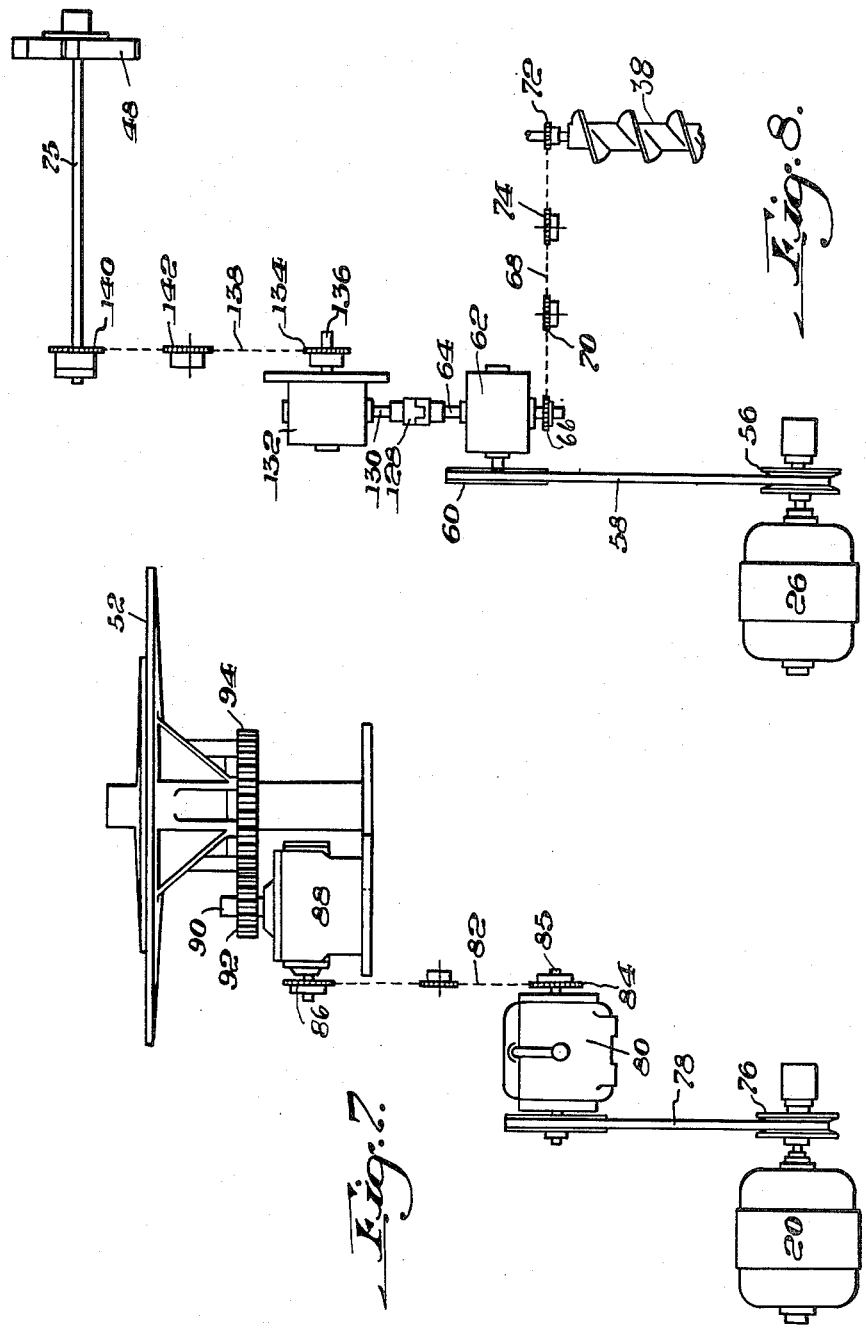

United States Patent Office 2,711,850
Patented June 28, 1955

2,711,850

DICED MEAT FILLING MACHINE

Robert H. Stimpson, Pittsburgh, Pa., assignor to H. J. Heinz Company, Pittsburgh, Pa., a corporation of Pennsylvania Application February 19, 1953, Serial No. 337,861

22 Claims. (Cl. 226—95)

This invention relates to a diced meat filling machine. More particularly, the invention relates to machines for depositing a measured quantity of diced or shredded meat into a can or container open at the top.

Many different kinds of foods which are prepared, packed in cans and sterilized are made of a substantial number of ingredients which are separately inserted into the cans. For example, many different kinds of soups, chowder, and pork and beans contain meat which is inserted into the cans separately from the other ingredients. The meats, such as cooked beef, chicken, turtle, clam, and bacon are generally diced or shredded into small pieces wherein the pieces have an irregular shape which tend to adhere to one another or adhere to the sides of the containers or feeders. The cans vary in the size from four ounces to fifty ounces or more, and it is important to accurately measure the weight of the meat put into each can of each size. When the product being apportioned to the cans is not free-flowing and will act to bridge over an opening, the accurate measurements of small quantities of meat especially for the small cans and the definite insertion of the measured quantity in each can presents a difficult problem. The can-filling machines are designed to fill from one hundred to five hundred cans per minutes and this complicates the positive insertion of a uniform quantity of meat in each can.

Most of the meat products are expensive so that the measurement of the product to have the required amount of meat to give a uniform finished product and to maintain a uniform cost of the production is also important.

The primary object of the present invention is to provide a machine which will accurately measure and definitely deposit the measured quantity of a non-free-flowing product into a container.

Another object of the invention is to provide a machine for inserting a uniform measured quantity of a non-free-flowing irregular particle shaped and sized product into a container while it is moving past a filling station.

A further object of the invention is to provide a machine for inserting a measured uniform quantity of a non-free-flowing product into containers at a rate of one hundred to five hundred containers per minute.

With these and other objects in view, the invention consists in the improved method and machine for depositing measured quantities of meat into containers as hereinafter described and particularly defined in the appended claims.

The various features of the invention are illustrated in the accompanying drawings in which:

Fig. 1 is a top plan view of a machine for depositing diced or shredded meat into cans;

Fig. 2 is a detailed view of a feeding table and a measuring channel for forming a continuous bar of meat, the detail being taken on the line II—II of Fig. 1;

Fig. 5 is a fragmentary plan view showing the relation of the feed table with the scraper feeder and the dead plate over the cans to be filled;

Fig. 7 is a diagrammatic view of the driving mechanism for the feed table;

Fig. 8 is a diagrammatic view of the driving mechanism for the can feed worm and the scraper feeder.

The present machine is used in combination with other filling machines for adding diced or shredded meat as one of the constituents of a food such as chicken soup to a can. All of the filling machines are generally grouped together so that the cans or containers move on a continuous conveyor belt from one machine to the next in order to have one or more ingredients inserted in the container at each machine.

Figure 3:
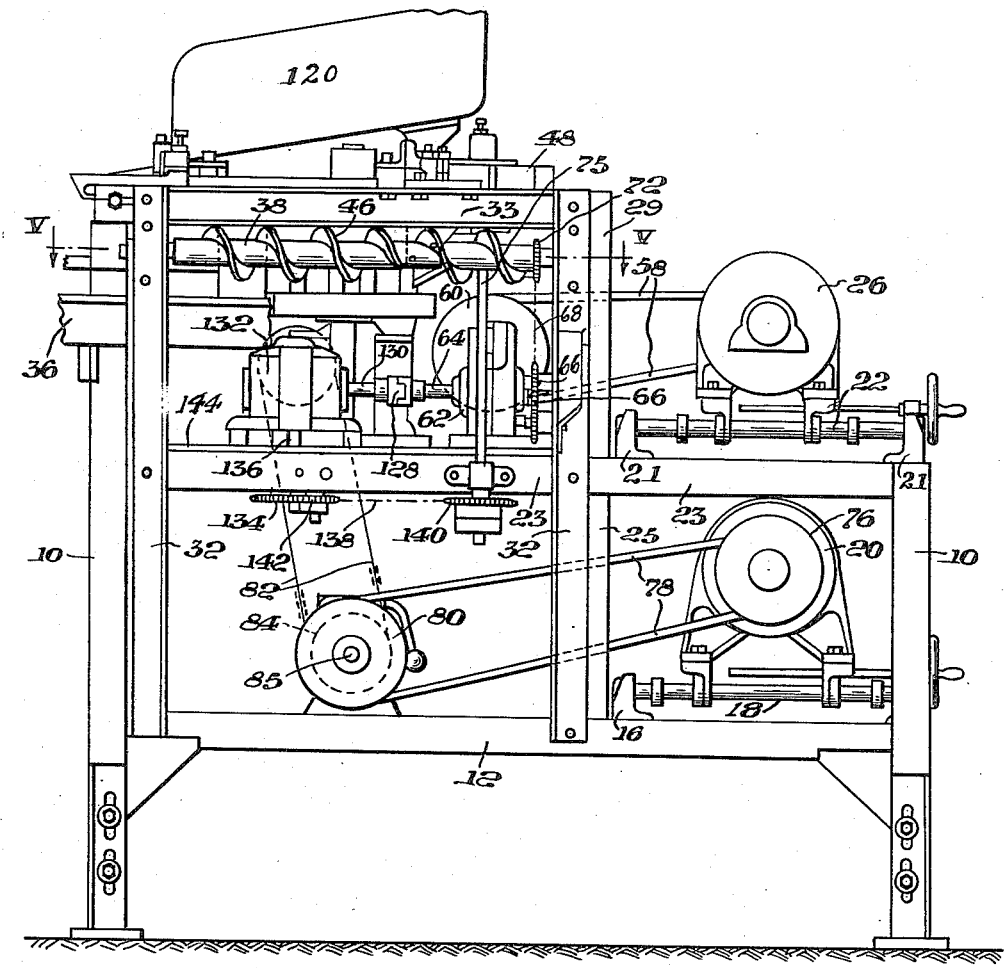
Fig. 3 is a view in side elevation of the filling machine shown in Fig. 1.

The filling machine of the present invention is mounted in a frame consisting of vertical corner posts 10 which are connected by lower side rails 12 Figs. 1 and 3 on the long sides of the frame and by a lower rail 14 at the rear and front of the frame. A cross bar 15 is connected between the bars 12 in the mid-portion thereof.

A motor frame consisting of one frame block 16 resting on the cross bar 15 and another frame block 17 resting on bar 14, with the frame blocks connected by rails 18, is mounted at the rear of the main frame. A table operating motor 20 is adjustably mounted on the motor frame Fig. 1.

A frame for a feeder operating motor consisting of frame blocks 21 connected by rails 22 Figs. 1 and 3 is mounted at the rear of the main machine frame at a higher elevation than the frame for the table operating motor. The frame blocks 21 are mounted on a top frame 23 which is supported by a corner post 10 and an intermediate post 24 Fig. 4 at one side and posts 25 at the other side Fig. 3. A feeder operating motor 26 is adjustably mounted on the rails 22..

At the front and top of the main frame is a frame for supporting a feed hopper and a feed channel. This frame consists of a top rail 28 extending around the frame and being supported at the four corners by posts 29 Figs. 1, 3 and 4. An auxiliary frame for the can positioning conveyor is mounted at the front side near the top of the main frame. This auxiliary frame is composed of side rails 32 Figs. 3 and 4 connected to rails 12 and 23 Fig. 3 and a top rail 33 is connected between the tops of side rails 32.

The containers are advanced to the machine on a flat top chain belt 34 which is positively driven and moves at a speed higher than the rate of movement of the containers through the filling machine while an ingredient is being deposited into the container. The belt 34 is supported upon and moves over an angle iron frame 36, Fig. 4, which is mounted in the auxiliary frame between the side rails 32 and the frame posts 29. The belt 34 brings the containers or cans to a worm conveyor 38 which is rotatably mounted in bearings 40 and 42 attached to the rails 32. When the belt presents the cans to the machine the can moves between the worm 38 and side guide 44 Figs. 1 and 4 mounted at the side of the belt opposite the worm 38. As soon as the can has entered a space in the flight 46 of the worm, the worm takes control of the advancing movement of the cans and with the conveyor belt moving faster than the worm advances the cans, the belt slips under the cans. The worm positively spaces the advancing cans a definite distance apart which is accurately controlled in order to place the cans below a filling station at a predetermined time with reference to the movement of a scraper feeder 48. As shown in Fig. 5 a dead plate 50 is located at the loading station across which the scraper feeder moves in carrying diced meat to the cans. The dead plate 50 has a curved edge to correspond to the peripheral edge of a circular feed table 52 and is attached to a bracket on the machine frame with its upper face on the same level as the top of table 52 to provide a surface across which meat is pushed by feeder 48 from the table to the loading station. The front edge of the dead plate is beveled and the top face and beveled edge are polished to facilitate movement of meat into the cans. The angular arrangement of the front edge of the dead plate directs the meat into the center of the open tops of the cans. Blades 53 of the feeder have a sharpened front edge to scrape meat from the table and a concave front face of the blade carries the meat across the dead plate. Immediately below the dead plate is located a funnel 54 Figs. 1, 4, 5 and 6 which is supported from the frame member 28. The funnel has an elongated opening 55, see Figs. 5 and 6, which is located close to the open tops of the cans on belt 34. The opening 55 is positioned above the central axes of the cans and is narrower than the can openings to insure that the meat will be deposited within the cans without falling into the spaces between the cans.

After the can has received the diced meat at the filling station, it is advanced by the worm until the can is released from the flight 46 of the worm and thereafter the belt 34 carries the can from the machine to the next filling machine or to a can closing and labeling machine.

The worm 38 is rotated in synchronism with the rotation of the feeder 48 in order to place the container at the filling station when the meat product is removed from the table and deposited in the can which is continuously moving under the funnel 54. To rotate the worm 38 and the feeder 48, the motor 26 has a variable speed-drive pulley 56, Figs. 1, 3 and 8, which is connected by a belt 58 with a pulley 60 on a worm gear speed-reducing mechanism 62. A horizontal shaft 64 on the speed reducer 62 has a sprocket wheel 66 thereon over which a sprocket chain 68, Fig. 4, runs to a sprocket wheel 70 on an arm 71. The chain runs from the sprocket wheel 70 to a sprocket wheel 72 mounted on the worm 38 and the chain then runs to an idler sprocket wheel 74 on an arm 71 and returns to a sprocket 66. By means of the variable speed pulley 56 and the gear reducer 62 substantially any desired speed of rotation of the worm may be obtained to properly control the movement of the containers advancing to the filling station.

Figure 4:
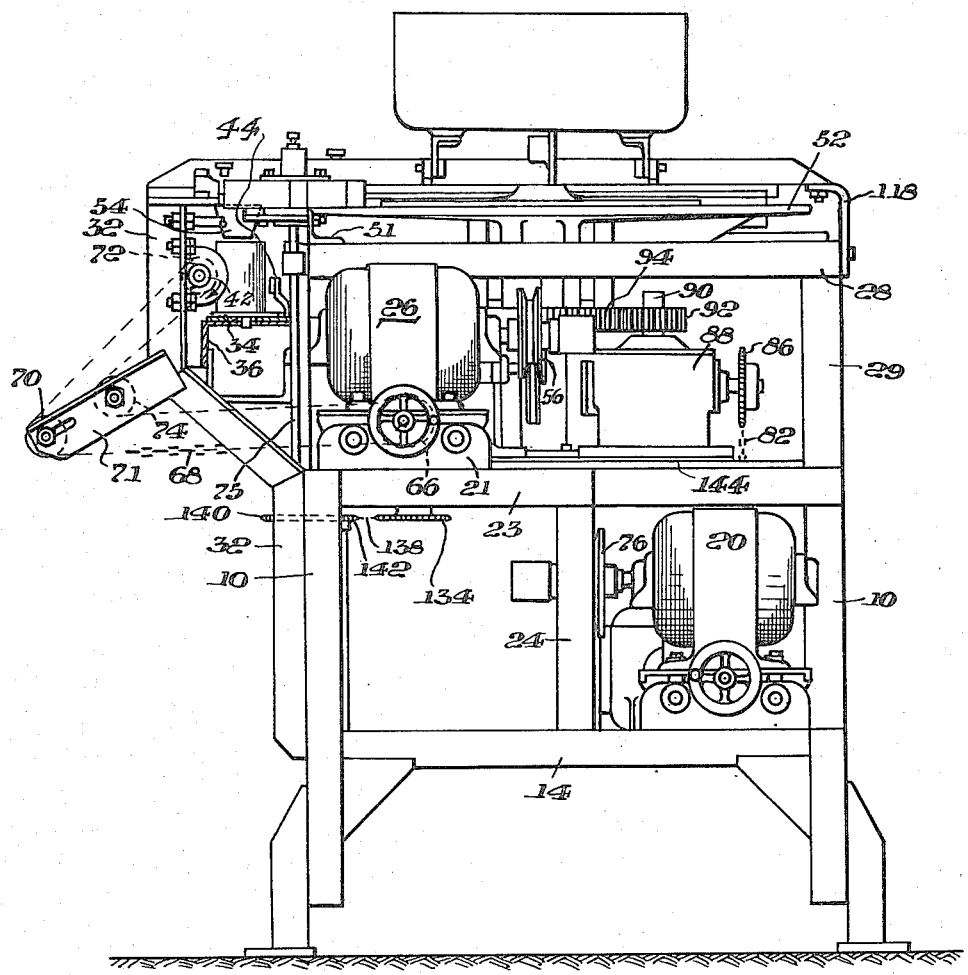
Fig. 4 is a rear end elevational view of the filling machine shown in Fig. 1.

The scraper feeder 48 which is mounted on the upper end of the vertical shaft 75, Figs. 1, 4 and 8, is also rotated from the motor 26 in synchronism with the worm 38 rotation to deposit diced meat in funnel 54 at the time a can is in position to receive the meat. The movement or rate of rotation of the scraper feeder is derived from the shaft of the worm gear box 62, Fig. 8. The shaft 64 of the worm gear box 62 is connected by a flexible coupling 128 with a shaft 130 of a worm gear box 132. A sprocket wheel 134 is mounted on the lower end of a shaft 136 extending out of the bottom of a gear box 132, Fig. 3. A sprocket chain 138 runs from the sprocket wheel 134 to a sprocket 140 secured to the lower end of the shaft 75 after passing over an idler sprocket 142. By this construction, the worm gear box 62 and variable speed pulley 56 control the speed of rotation of the worm 38 and the worm gear box 132 with the pulley control the speed of the scraper feeder. The scraper blades 53 are formed on a plate 53a which is disposed beneath and adjustably secured to a plate 139 fixed on the shaft 75. These independent adjustments of the scraper feeder on the shaft 75 and the rate of rotation the scraper feeder allows the scraper feeder and the worm gear to be brought into synchronism to properly locate the container under the filling station to receive the diced meat from the scraper feeder.

The feed table 52 is a circular table mounted on the top of the machine to rotate on a vertical axis, Fig. 7.

The table is rotated by means of the motor 20 and adjustments are provided to control the speed of rotation of the table as follows: A variable speed pulley 76 on the shaft of motor 20, Figs. 3 and 7, is connected by means of a belt 78 with a selector speed changer 80 positioned in the frame below the table. A chain belt 82 is connected between a sprocket wheel 84 on a horizontal shaft 85 of the speed changer 80, and a sprocket wheel 86, Figs. 4 and 7, of a worm driving gear box 88. A vertical shaft 90 extends upwardly from the gear box 88 upon which is mounted a spur gear 92 which meshes with a spur gear 94 secured to the base of the table 52, Fig. 7. By means of the variable speed pulley 76 and the selective speed changer 80, the table can be given substantially any desired speed or rotation. The table may be rotated in the range of one revolution per minute to ten revolutions per minute while the worm 38 rotates in the range of one hundred revolutions to five hundred revolutions per minute and the scraper feeder 48 rotates in a range of twelve to one hundred twenty five revolutions per minute.

The table has a flat peripheral upper face 96, Fig. 2, upon which the diced or shredded meat is prepared to be carried to the filling station. A pair of guide rails are mounted over the upper outer edge of the table as shown in Fig. 2. An outer guide rail 98, Fig. 1, is secured to supports 100 which in turn are secured to the machine frame. The outer guide rail has a curvature which is concentric with the center of the table and is preferably made of stainless steel with the inner surface 102, Fig. 2, polished to permit the diced meat to be moved between the outer rail 98 and an inner rail 104. Adjacent the filling station the guide rail 98 has an outwardly curved guide 106, Fig. 1 and 6, which is adapted to guide the diced meat when it is removed from the table by blades 53 of the scraper feeder 48. This curved guide 106 is secured by a clamp 108 to a plate 111, Fig. 6, secured to the cross rail 33. The face of the guide 106 is concentric with the axis of the feeder 48 and the blades 53 of the scraper feeder move close to the curved face in transporting the diced meat from the table to the funnel 54. Two inclined blades 112 are secured to the inner face of guide 106 and arranged to engage the cutting ends of the blades 53 to scrape off any meat that adheres to the blades. The scraping blades 112 are spaced apart to assist in dislodging meat from the blades 53. The inner surface of the guide and the inclined blades 112 are made of stainless steel and are polished to secure a positive discharge of meat into the funnel 54 located below them. An inner guide rail 104 has a curvature which is concentric with the center of the table and forms with the guide 98 a channel in which a continuous bar of diced meat may be inserted for advancing to the scraper feeder. Guide 104 is secured to the support 100 Fig. 1 and a frame cross brace 116 which extends across the table 52. To assist the feed of meat the guide 104 is made of stainless steel and the face of the guide which contacts the meat is highly polished to facilitate movement of the meat between the guides 98 and 104.

A feed hopper 120 which is preferably made of stainless steel is supported upon the bar 116 with its lower feeding edge 112, Fig. 1, resting on the guide 104 and having substantially the same curvature as the guide. The diced meat is placed in the hopper 120 and is preferably distributed in the channel between the guides by an operator who takes care to keep the portion of the channel in front of the hopper filled to the top of the guides in order to make up the continuous bar of diced meat being fed to the filling station. The size of the channel which forms the continuous bar of diced meat is important in measuring the amount of meat that is fed to each container. The channel is preferably about three-fourths of an inch deep and may be from three-fourths to two inches wide, although these dimensions may be varied for feeding the meat to different sizes of containers. When the inner guide is spaced different distances from the outer guide, it is necessary to use separate guides 104 for each size of channel in order to provide a channel with concentric sides and a bar of uniform width in order that the meat will move through the channel freely without adhering to the guides.

The gear boxes 62, 88 and 132 and the vertical shaft for the table 52 are all mounted on a plate 144, Figs. 3 and 4, which is mounted on top of bars 23 under table 52.

It will be noted that in Figs. 1 and 5 scraper feed 48 is shown as having eight cutting blades. In Fig. 3 a scraper feed is shown having four blades. These two different designs of scraper feeders are used for feeding different kinds of meat. The feeder of Fig. 1 has the advantage that it can be rotated much slower in feeding and avoid the development of centrifugal force which may interfere with the proper feeding operation. The four bladed feeder is well suited for feeding diced beef but is not so efficient for feeding a sticky meat such as diced chicken. The number of cutter blades may be varied in securing the desired feeding operation.

Figure 6:
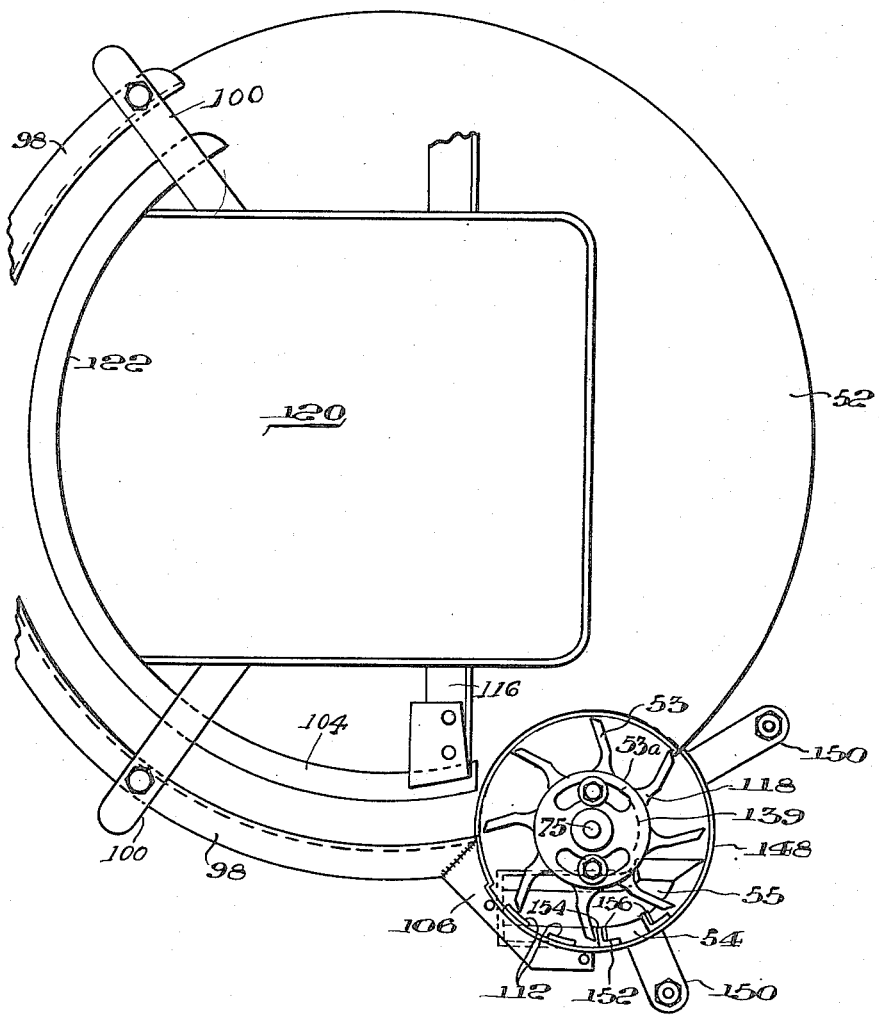
Fig. 6 is a detail plan view showing the mounting of the diced meat hopper, the filling guide and the scraper feeder.

To assist in definitely depositing a measured portion of meat in each can, a guard 146 Fig. 6 is mounted over the scraper-feeder 48. The guard 146 consists of a circular metal band 148 having straps 150 secured to the outside thereof by which the guard may be secured to the machine frame. On the inside of the band 148 a pair of inclined scraper blades 152 are attached which have a cutting edge 154 arranged closely to the cutting edges of the feeder blades. The blades 152 have a portion 156 which overhangs the edge 154, so that any meat adhering to the feeder blades 53 will be scraped off by the blade portions 156. Preferably a transparent sheet of plastic is mounted on top of the band 148 to protect the operators.

The rate of filling cans may be increased or decreased by changing the rate of rotation of the worm 38, and the scraper and worm must be brought into synchronism in order to properly time their movement to deposit the diced meat in the can. The amount of meat which is deposited into the can may be varied by increasing or decreasing the size or cross-sectional area of the bar of meat formed in the channel between the guides 98 and 104, and the rate of rotation of the table 52. By increasing the rate of movement of the table, the scraper feeder will remove more meat product from the front end of the bar of meat with each blade of the feeder.

The present invention is particularly adapted for depositing in containers a product such as diced meat, shredded chicken or fish which tends to adhere to the sides of the volumetric measuring cups and to bridge over openings. The products do not have a uniform particle size or shape and are not free-flowing. By compacting the shredded meat into a comparatively continuous bar and scraping off a definite section of the bar as it advances through the guides, the material scraped off may be moved across the plate 50 and guide 110 to be deposited into the end of the receiver.

The preferred form of the invention having been thus described, what is claimed as new is:

1. A machine for depositing a measured quantity of non-free-flowing material in containers comprising, a conveyor for advance containers in a single line to a loading station, a feeder having a scraping face movable over the loading station, means to operate the conveyor to advance the containers in spaced relation at a predetermined rate under the station, means to move the feeder at a rate in synchronism with the container advancing rate to cause the feeder to present material to the loading station when the container is positioned under the station by the conveyor, a feed table having guides associated therewith to present food material as a bar of definite cross-sectional area into the path of the scraping face of the feeder adjacent the loading station, and means to control the rate of movement of the table and the rate of movement of the feeder to scrape a measured quantity of material from the feed table to be deposited into a container at the loading station.

2. The machine defined in claim 1 in which the conveyor is continuously operated by a motor to move the containers under the loading station during the filling operation.

3. The machine defined in claim 2 in which a funnel is mounted at the loading station with its discharge outlet closely adjacent the top of containers advancing under the station.

4. The machine defined in claim 3 in which the funnel outlet is elongated in the line of movement of the containers and the outlet is positioned centrally of the container openings and narrower than the openings to prevent material from passing into the spaces between containers.

5. The machine defined in claim 4 in which the feeder is mounted on a shaft to rotate across the loading station and funnel, a circular guide having a face closely adjacent the path of movement of the cutting edge of the feeder mounted between feed guides and the loading station to support the material moving from the feed guides to the loading station and scraper blades are mounted on the guide to remove material from the feeder as it moves across the funnel.

6. The machine defined in claim 1 in which the feed table is round and rotates under inner and outer guides which form a channel of predetermined cross-sectional area to form a bar of material to be advanced to the loading station.

7. The machine defined in claim 6 in which different inner guides having a curvature concentric with the table axis may be used with the outer guide to vary the cross-sectional area of the channel to vary the quantity of material presented as a bar to the feeder.

8. The machine defined in claim 6 in which the table is round and the guides are stationary and have a concentric shape with the table center to form a channel through which the bar of material may move with the table without the sides of the bar of material binding on the guides.

9. The machine defined in claim 6 in which the feeder has a blade movable over the table and has a comparatively sharp vertical edge to scrape off a predetermined quantity of material from the front end of the bar of material advancing with the table.

10. The machine defined in claim 6 in which the feeder is composed of a series of blades movable over the table, each of said blades having a sharp edge extending above the table a sufficient distance to scrape off a predetermined quantity of material from the front end of the bar advancing with the table, said feeder movement being synchronized with the conveyor movement to deposit a measured quantity of material in the container with the movement of each scraper blade across the bar of material.

11. The machine defined in claim 1 in which the edge of the scraper moves closely adjacent the ends of the guides in severing a measured quantity of material from the front end of the bar.

12. The machine defined in claim 1 in which the loading station has a dead plate and a funnel mounted above the path of travel of the containers, the shape of the dead plate and funnel opening and the shape of a scraper blade being constructed and arranged to deposit material from the feeder through the funnel into the top of the container while the container is moving under the opening without spilling of material over the edge of the open top of the container.

13. The machine defined in claim 1 in which the conveyor and the feeder are each driven by variable speed motors which are independently adjustable in relation to the rate of movement of the table to permit their movement to vary the quantity of material to be deposited in each container.

14. The machine defined in claim 1 in which the guides over the feeder table extend through a substantial arc around the table, and a feed hopper is mounted with an open end adjacent the guides to permit a bar of material of substantial length to be formed in the channel while the table is rotated.

15. The machine defined in claim 1 in which the feeder is rotated by a shaft and a circular guide mounted between the guides and the loading station adjacent the cutting face of the feeder supports the material being moved by the feeder until it reaches the loading station.

16. The machine defined in claim 15 in which a scraper is mounted in the face of the guide across which the material moves to scrape the material off the feeder.

17. A method of depositing predetermined quantities of a non-free-flowing diced or shreaded material of irregular shape into the open tops of containers which are moving at a rate in excess of one hundred containers per minute under a loading station comprising advancing the containers in single file in a uniform spaced relationship under the loading station, forming the diced or shreaded material into a bar of predetermined cross-sectional area, continuously advancing the bar of material to a point adjacent the loading station, intermittently scraping a measured quantity of material from the front end of the bar with a cutting movement of a feeder for deposit in one container; pushing the severed measured quantity of material into the open end of the container moving under the station, and maintaining the scraper movement in synchronism with the advancing movement of the containers.

18. The method defined in claim 17 in which the amount of material deposited in each container is varied by varying the rate of advance of the bar of diced or shredded material relatively to the scraper movement.

19. The method defined in claim 17 in which the amount of material deposited in each container is varied by varying the cross-sectional area of the bar of material.

20. The method defined in claim 17 in which the rate of filling of the containers is varied by changing in synchronism, the rate of movement of the scraper feeder and the rate of advance of the containers.

21. The method defined in claim 20 in which the amount of material loaded into each container for any specific filling rate is varied by changing the rate of advancing movement of material to the loading station.

22. The method defined in claim 20 in which the amount of material loaded into each container for any specific filling rate is varied by changing the cross-sectional area of the bar of material advancing to the loading station.

References Cited in the file of this patent

UNITED STATES PATENTS

| | | |
|---|---|---|
| 1,312,640 | Mallinckrodt | Aug. 12, 1919 |
| 2,217,896 | Fonken | Oct. 15, 1940 |
| 2,337,539 | Buechek | Dec. 28, 1943 |
| 2,631,768 | Martin et al. | Mar. 17, 1953 |